United States Patent
Mueller et al.

(10) Patent No.: US 10,703,413 B2
(45) Date of Patent: Jul. 7, 2020

(54) REAR DRIVE UNIT DETACHMENT SYSTEM AND METHOD

(71) Applicant: FORD GLOBAL TECHNOLOGIES, LLC, Dearborn, MI (US)

(72) Inventors: Dominik Mueller, Euskirchen (DE); Joergen Hilmann, Leverkusen (DE); Istvan Somogyvari, Cologne (DE); Djamel Bouzit, Ann Arbor, MI (US); Deb Kumar Bonnerjee, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 226 days.

(21) Appl. No.: 15/252,759

(22) Filed: Aug. 31, 2016

(65) Prior Publication Data
US 2018/0057061 A1 Mar. 1, 2018

(51) Int. Cl.
| | |
|---|---|
| *B62D 21/15* | (2006.01) |
| *B60K 17/24* | (2006.01) |
| *F16M 13/02* | (2006.01) |
| *B60K 17/348* | (2006.01) |

(52) U.S. Cl.
CPC ........... *B62D 21/152* (2013.01); *B60K 17/24* (2013.01); *F16M 13/022* (2013.01); *B60K 17/348* (2013.01)

(58) Field of Classification Search
CPC ...... B60K 17/16; B60K 17/24; B60K 17/348; B62D 21/155; B62D 21/152; B60G 2204/19; F16M 13/022
See application file for complete search history.

(56) References Cited

U.S. PATENT DOCUMENTS

| | | | | | |
|---|---|---|---|---|---|
| 2,963,106 A | * | 12/1960 | Sampietro | ............. | B60K 17/24 180/376 |
| 3,578,782 A | * | 5/1971 | Miyoshi | ................ | B62D 1/197 180/232 |
| 3,604,527 A | * | 9/1971 | Price | ..................... | B60K 17/04 180/291 |
| 3,848,886 A | * | 11/1974 | Feustel | .................. | B60R 19/34 180/291 |
| 3,860,258 A | * | 1/1975 | Feustel | .................. | B60R 19/34 180/232 |
| 4,856,751 A | * | 8/1989 | Ohba | .................. | B60K 5/1291 180/291 |

(Continued)

FOREIGN PATENT DOCUMENTS

JP       2015174642 A       10/2015

OTHER PUBLICATIONS

English Machine Translation of JP2015174642A.

*Primary Examiner* — Paul N Dickson
*Assistant Examiner* — Timothy Wilhelm
(74) *Attorney, Agent, or Firm* — Ray Coppiellie; King & Schickli, PLLC

(57) ABSTRACT

An RDU detachment system is provided and includes a front RDU mounting bracket, a rear RDU mounting bracket, a rear cross member including an inclined face oriented toward the RDU and at least one bushing connecting the rear RDU mounting bracket with the rear cross member. A method of detaching an RDU from a rear subframe of a motor vehicle in response to an impact force transmitted to the RDU through a driveline is also disclosed.

8 Claims, 13 Drawing Sheets

(56) References Cited

U.S. PATENT DOCUMENTS

| | | | | |
|---|---|---|---|---|
| 5,036,943 A * | 8/1991 | Kashiwagi | B60K 17/00 | 180/312 |
| 5,114,184 A * | 5/1992 | Shimomura | B62D 21/155 | 280/784 |
| 5,240,086 A * | 8/1993 | Hopely, Jr. | B62K 5/025 | 180/208 |
| 5,251,932 A * | 10/1993 | Ide | B60G 21/0551 | 180/427 |
| 5,906,410 A * | 5/1999 | Dalinkiewicz | B60R 19/00 | 296/187.03 |
| 6,213,245 B1 * | 4/2001 | Murata | B60K 17/00 | 180/312 |
| 6,394,215 B1 * | 5/2002 | Masuda | B60K 17/24 | 180/232 |
| 6,435,299 B1 * | 8/2002 | Miller | B60K 17/24 | 180/379 |
| 6,672,768 B2 * | 1/2004 | Borsch | B60K 17/24 | 267/140.2 |
| 7,175,532 B2 * | 2/2007 | Tapazoglou | B60K 17/22 | 180/232 |
| 7,380,829 B2 * | 6/2008 | Kishima | B62D 21/155 | 180/232 |
| 7,562,886 B2 * | 7/2009 | Takeda | B62D 21/155 | 180/232 |
| 7,886,861 B2 * | 2/2011 | Nozaki | B60K 1/00 | 180/232 |
| 7,922,394 B2 * | 4/2011 | Hirakawa | B60K 17/22 | 180/381 |
| 7,938,221 B2 * | 5/2011 | Matsuzaki | B60G 9/02 | 180/352 |
| 8,500,191 B1 * | 8/2013 | Baccouche | B62D 21/155 | 280/784 |
| 8,657,059 B2 * | 2/2014 | Yamada | B60K 15/063 | 180/312 |
| 8,794,370 B2 * | 8/2014 | Hiramatsu | B60K 17/16 | 180/274 |
| 8,794,646 B1 * | 8/2014 | Onishi | B62D 21/155 | 280/124.109 |
| 8,985,630 B2 * | 3/2015 | Sangha | B62D 27/065 | 280/124.109 |
| 9,085,234 B2 * | 7/2015 | Saneyoshi | B60K 17/16 | |
| 9,221,496 B2 * | 12/2015 | Barr | B62D 21/11 | |
| 9,616,931 B2 * | 4/2017 | Sangha | B62D 21/155 | |
| 9,676,415 B2 * | 6/2017 | Poirier | B62D 21/11 | |
| 9,718,356 B1 * | 8/2017 | Ikeda | B60K 26/00 | |
| 9,944,322 B2 * | 4/2018 | Baccouche | B62D 21/15 | |
| 2005/0061573 A1 * | 3/2005 | Mizuno | B60K 17/04 | 180/376 |
| 2008/0238138 A1 * | 10/2008 | Vallee | B60D 1/07 | 296/167 |
| 2013/0008735 A1 * | 1/2013 | Hiramatsu | B60K 17/16 | 180/291 |
| 2013/0175110 A1 * | 7/2013 | Nakata | E02F 9/006 | 180/383 |
| 2016/0107694 A1 * | 4/2016 | Kaneko | B62D 21/155 | 280/784 |
| 2017/0217310 A1 * | 8/2017 | Ikeda | B60K 26/00 | |

* cited by examiner

REAR DRIVE UNIT DETACHMENT SYSTEM AND METHOD

TECHNICAL FIELD

This document relates generally to the motor vehicle equipment field and, more particularly, to a rear drive unit detachment system during vehicle frontal crash and related method that (1) substantially reduce the impulse energy when the rear drive unit hits the rear subframe and (2) then rotates and guides the rear drive unit downward toward the ground.

BACKGROUND

All wheel drive motor vehicles have higher deceleration pulses compared to front wheel drive motor vehicles in the event of a frontal crash. This is due to the fact that the power take-off unit and driveline of the motor vehicle provide a direct load path that transmits the frontal impact force to the rear drive unit (RDU).

This document relates to a new and improved RDU detachment system and method that substantially reduce the impulse energy when the RDU hits the rear subframe and, more particularly, the rear cross member of the rear subframe.

Further, the RDU detachment system and related method provide a timely rotation moment to the RDU while guiding the RDU downward toward the ground as it is displaced rearwardly by the force of the frontal impact.

SUMMARY

In accordance with the purposes and benefits described herein, an RDU detachment system is provided for a motor vehicle. That RDU detachment system comprises a front RDU mounting bracket, a rear RDU mounting bracket and a rear cross member. The front RDU mounting bracket has an engineered yield to allow rearward displacement of the RDU in response to an impact force transmitted to the RDU through a driveline of the motor vehicle. The rear cross membrane includes an inclined face oriented toward the RDU. At least one bushing connects the rear RDU mounting bracket to the rear cross member.

The inclined face may have an upper end oriented vehicle forward of a lower end so that the RDU is inclined in a downward direction. The upper end of the inclined face may include an initial contact point that projects toward the RDU. That initial contact point may be located above a center of applied force line extending along the driveline and through the RDU toward the rear cross member of the rear subframe whereby the initial contact point introduces a moment to rotate the RDU downward when the RDU is displaced into the rear cross member.

The front mounting bracket may include a driveline opening and the engineered yield may include a first designed fracture line in the first mounting bracket on a first side of the driveline opening and a second designed fracture line in the front mounting bracket on a second side of the driveline opening.

In a second possible embodiment, the front mounting bracket may include a driveline opening and the engineered yield may include a first designed deformation zone in the front mounting bracket on a first side of the driveline opening and a second designed deformation zone in the front mounting bracket on a second side of the driveline opening.

In this second possible embodiment, the front mounting bracket may include (a) a first slip RDU mounting point on the first side of the driveline opening and a first fixed RDU mounting point on the first side of the driveline opening between the first slip RDU mounting point and the driveline opening and (b) a second RDU slip mounting point on the second side of the driveline opening and a second fixed RDU mounting point on the second side of the driveline opening between the second slip RDU mounting point and the driveline opening.

In this second possible embodiment, the first slip RDU mounting point may include a first bolt received in a first elongated slot in the front RDU mounting bracket wherein the first elongated slot has a first longitudinal axis extending in a horizontal plane substantially perpendicular to the driveline. Further, the second slip RDU mounting point may include a second bolt received in a second elongated slot in the front RDU mounting bracket wherein the second elongated slot has a second longitudinal axis extending in the horizontal plane substantially perpendicular to the driveline.

In still another possible embodiment, the front mounting bracket may include a driveline opening and the engineered yield may include a designed fracture line in the first mounting bracket on a first side of the driveline opening and a designed deformation zone in the front mounting bracket on a second side of the driveline opening. In such an embodiment, the front mounting bracket may include a slip RDU mounting point on the second side of the driveline opening and a fixed RDU mounting point on the second side of the driveline opening between the slip RDU mounting point and the driveline opening. Further, that slip RDU mounting point may include a first bolt received in an elongated slot in the front RDU mounting bracket wherein the elongated slot has a longitudinal axis extending in a horizontal plane substantially perpendicular to the driveline.

In accordance with an additional aspect, a method is provided of detaching an RDU from a rear subframe of a motor vehicle in response to an impact force transmitted to the RDU through a driveline. Such an impact force may be associated with a frontal crash of the motor vehicle. That method comprises the steps of (a) orienting a downwardly inclined surface of the rear subframe toward the RDU, (b) dissipating a portion of the impact force prior to the RDU contacting the rear subframe and (c) introducing a moment to rotate the RDU downward when the RDU contacts the rear subframe by means of engaging the RDU at an initial contact point located on the rear subframe above a center of the applied force line extending along the driveline and through the RDU toward the rear subframe.

The dissipating step may further include the step of deforming a front RDU mounting bracket so as to allow the RDU to be displaced rearwardly. That dissipating may include pushing at least one bushing at least partially out of the rear subframe where the at least one bushing connects a rear RDU mounting bracket to the rear subframe.

Further, the deforming may include fracturing the front RDU mounting bracket along at least one designed fracture line. In other embodiments, the deforming may include bending the front RDU mounting bracket at a designed deformation zone. In still other embodiments, the deforming may include fracturing the front RDU mounting bracket at one designed fracture line and bending the front RDU mounting bracket at a designed deformation zone.

Still further, the method may include the step of guiding the RDU downward by engaging the RDU with the downwardly inclined surface as the RDU is being rotated. Still further, the method may include the step of deforming the driveline as the RDU is being rotated and displaced downward.

In the following description, there are shown and described several preferred embodiments of the RDU detachment system and the related method of detaching an RDU from a rear subframe of a motor vehicle in response to an impact force transmitted to the RDU through a driveline. As it should be realized, the RDU detachment system and method are capable of other, different embodiments and their several details are capable of modification in various, obvious aspects all without departing from the RDU detachment system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the RDU detachment system and method and together with the description serve to explain certain principles thereof. In the drawing figures.

Figure 5A:
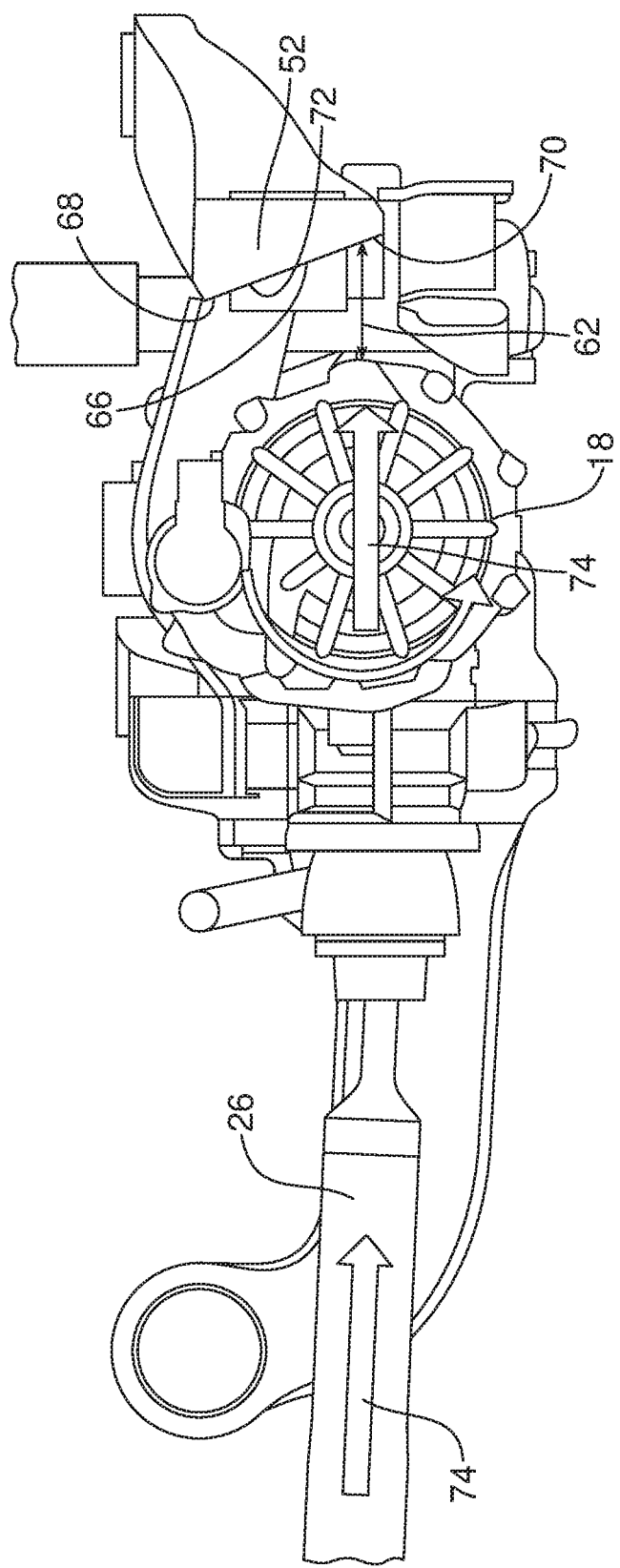
Figure 5B:
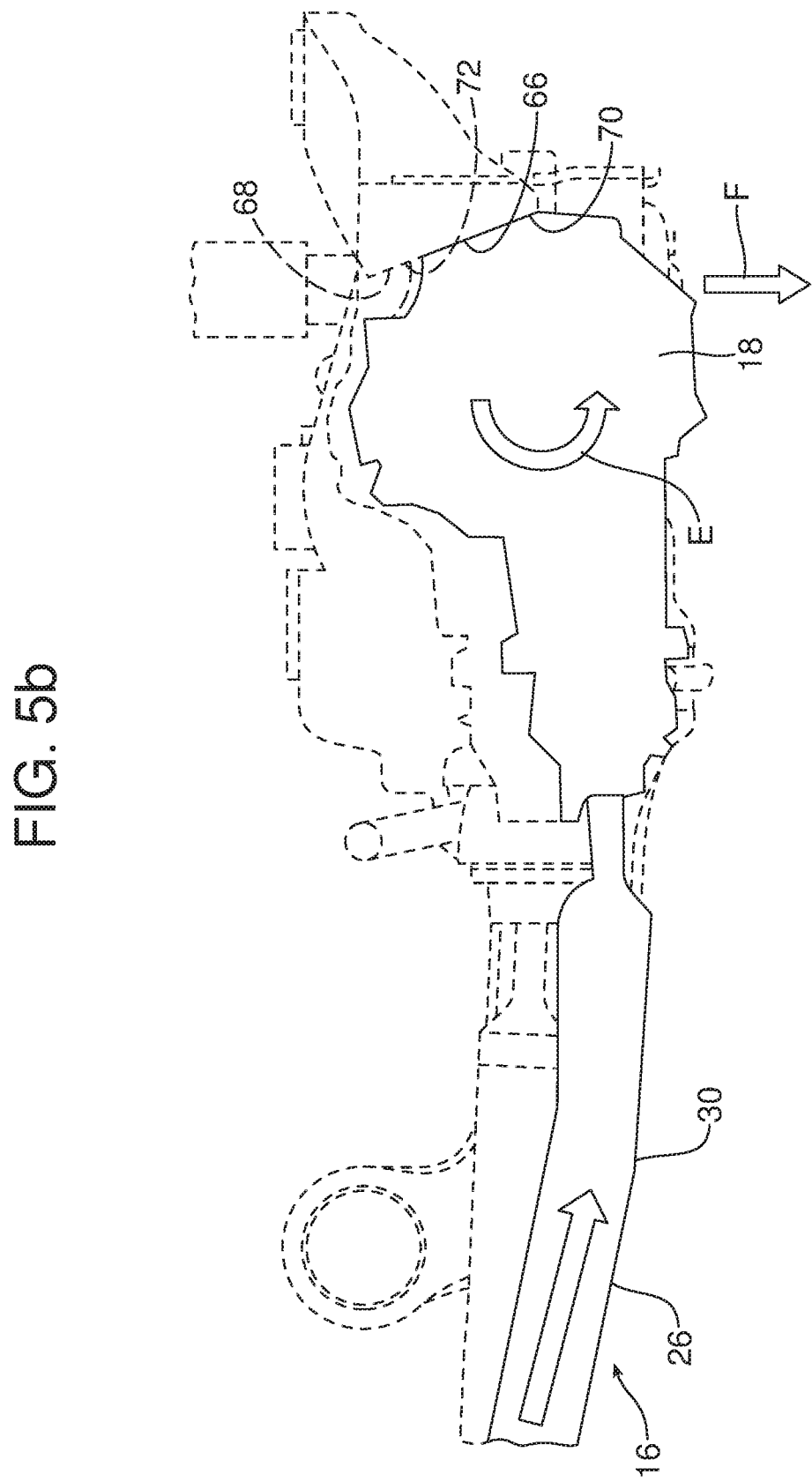

FIGS. 5a and 5b are side elevational schematic views of the RDU illustrating how the inclined surface on the rear cross member of the rear subframe contacts the RDU at an initial contact point above the center of applied force thereby initiating or introducing a moment to rotate the RDU downward as the RDU is guided downward by the inclined surface beneath the rear subframe and other components of the motor vehicle.

Figure 6A:
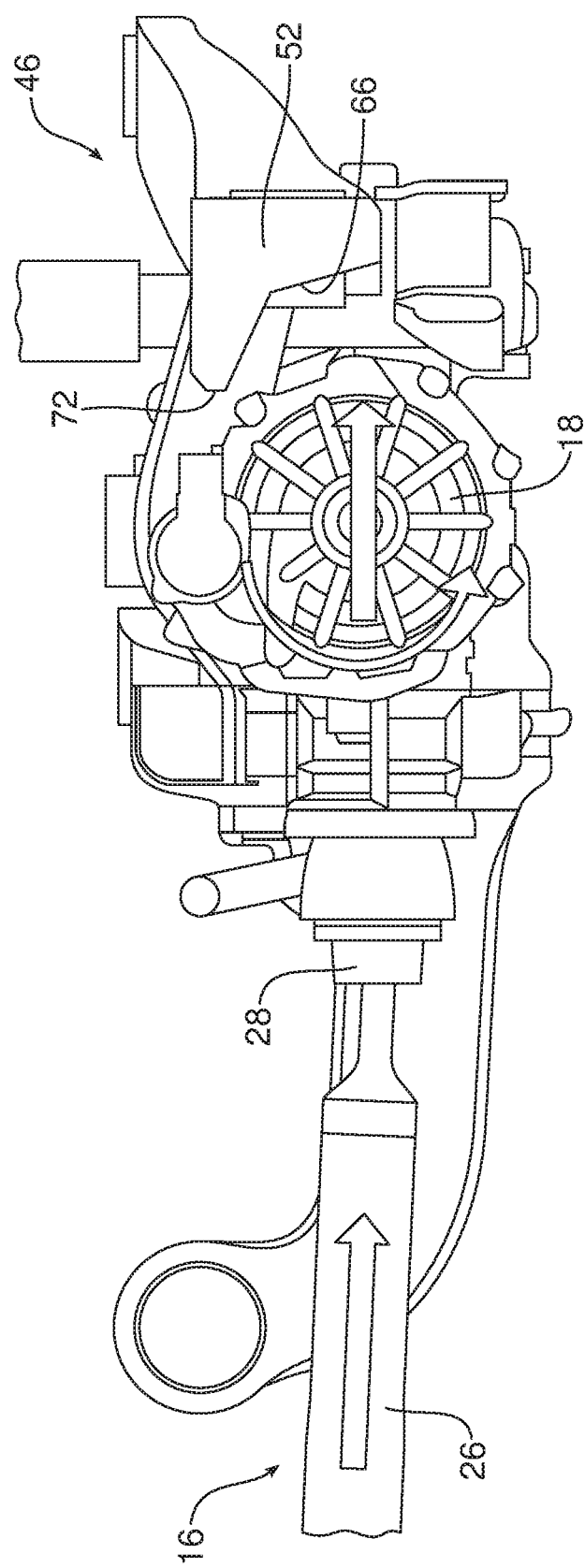
Figure 6B:
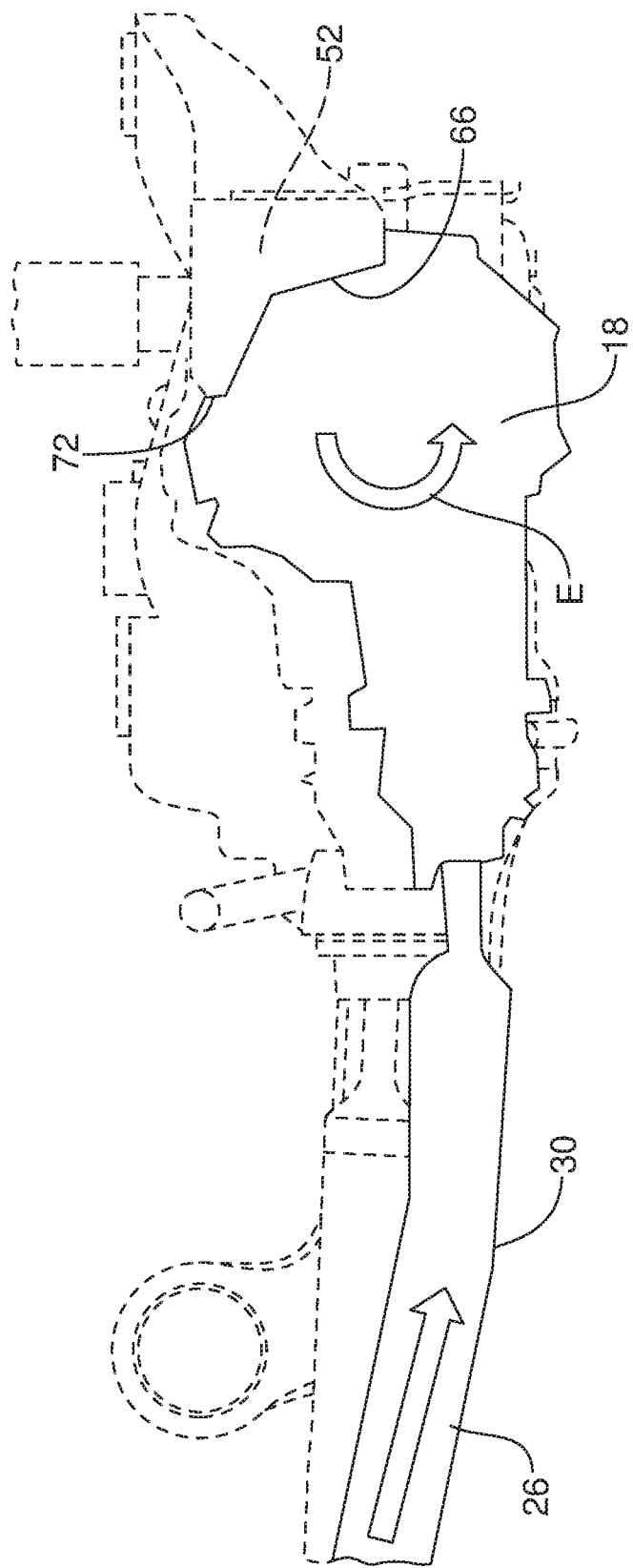

FIGS. 6a and 6b are views similar to FIGS. 5a and 5b showing an alternative embodiment wherein the inclined face includes a forwardly projecting initial contact point.

Reference will now be made in detail to the present preferred embodiments of the RDU detachment system and the RDU detachment method, examples of which are illustrated in the accompanying drawing figures.

DETAILED DESCRIPTION

Figure 1A:
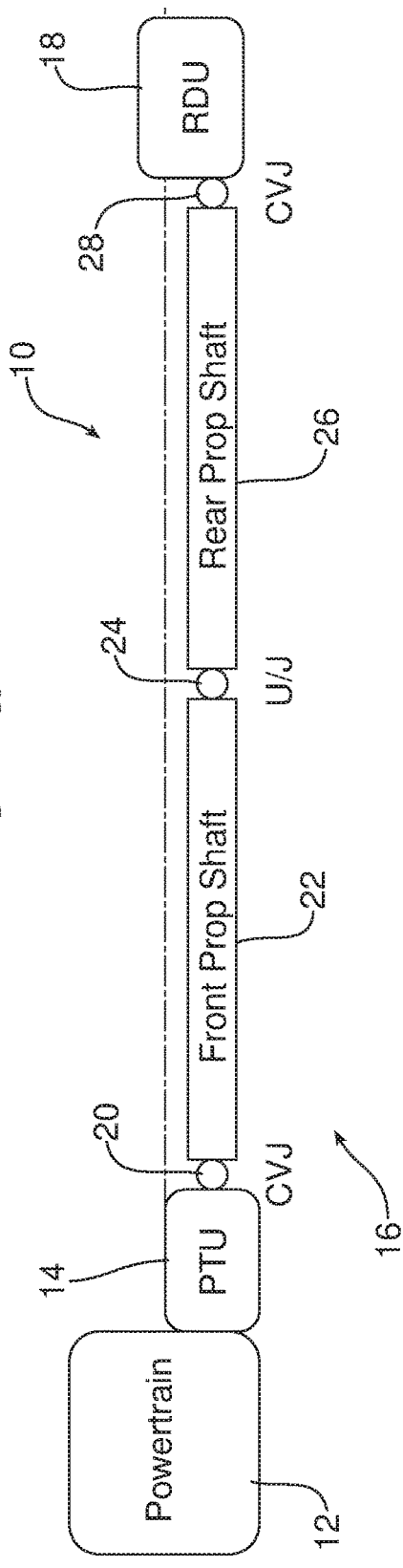
FIG. 1a is a schematic block diagram illustrating a drive system of a motor vehicle in a normal operating state.

Reference is now made to FIG. 1a illustrating a power system 10 of a motor vehicle. That power system includes a power train 12 that is connected to a power transfer unit (PTU) 14. The PTU 14 is connected by means of a driveline, generally designated by reference numeral 16 to the RDU 18. In the illustrated embodiment, the driveline 16 includes a constant velocity joint 20, a front prop shaft 22, a universal joint 24, a rear prop shaft 26 and a second constant velocity 28. As shown, the first constant velocity joint 20 connects the PTU 14 to the first prop shaft 22. The universal joint 24 connects the front prop shaft 22 to the rear prop shaft 26. The second constant velocity joint 28 connects the rear prop shaft 26 to the RDU 18. FIG. 1a illustrates the power system 10 in a normal or pre-crash condition.

Figure 1B:
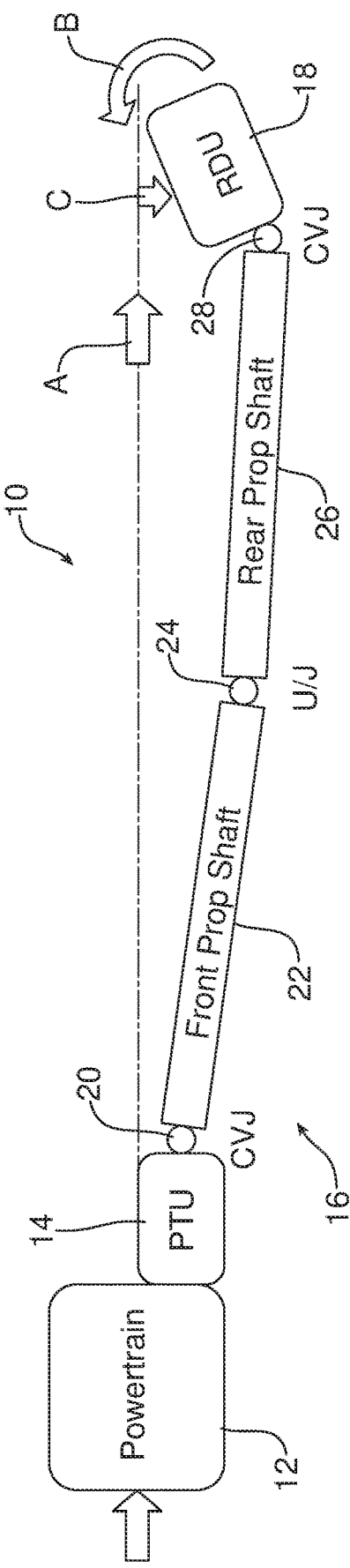
FIG. 1b is a schematic block diagram similar to FIG. 1a but illustrating the drive system wherein the RDU has been properly detached in a desired manner in response to an impact force from a frontal collision that is transmitted to the RDU through the driveline of the motor vehicle.

FIG. 1b is a schematic illustration of the power system 10 in a post-crash condition following a frontal impact wherein the impact force is transmitted from the power train 12 and PTU 14 through the driveline 16 to the RDU 18 (note action arrows A). As illustrated in FIG. 1b this results in the RDU 18 being rotated (note action arrow B) and forced downward (note action arrow C). Under certain circumstances the rear prop shaft 26 may also be bent, elongated or deformed, to absorb additional crash energy and help accommodate the desired rotating and downward movement of the RDU.

Figure 2A:
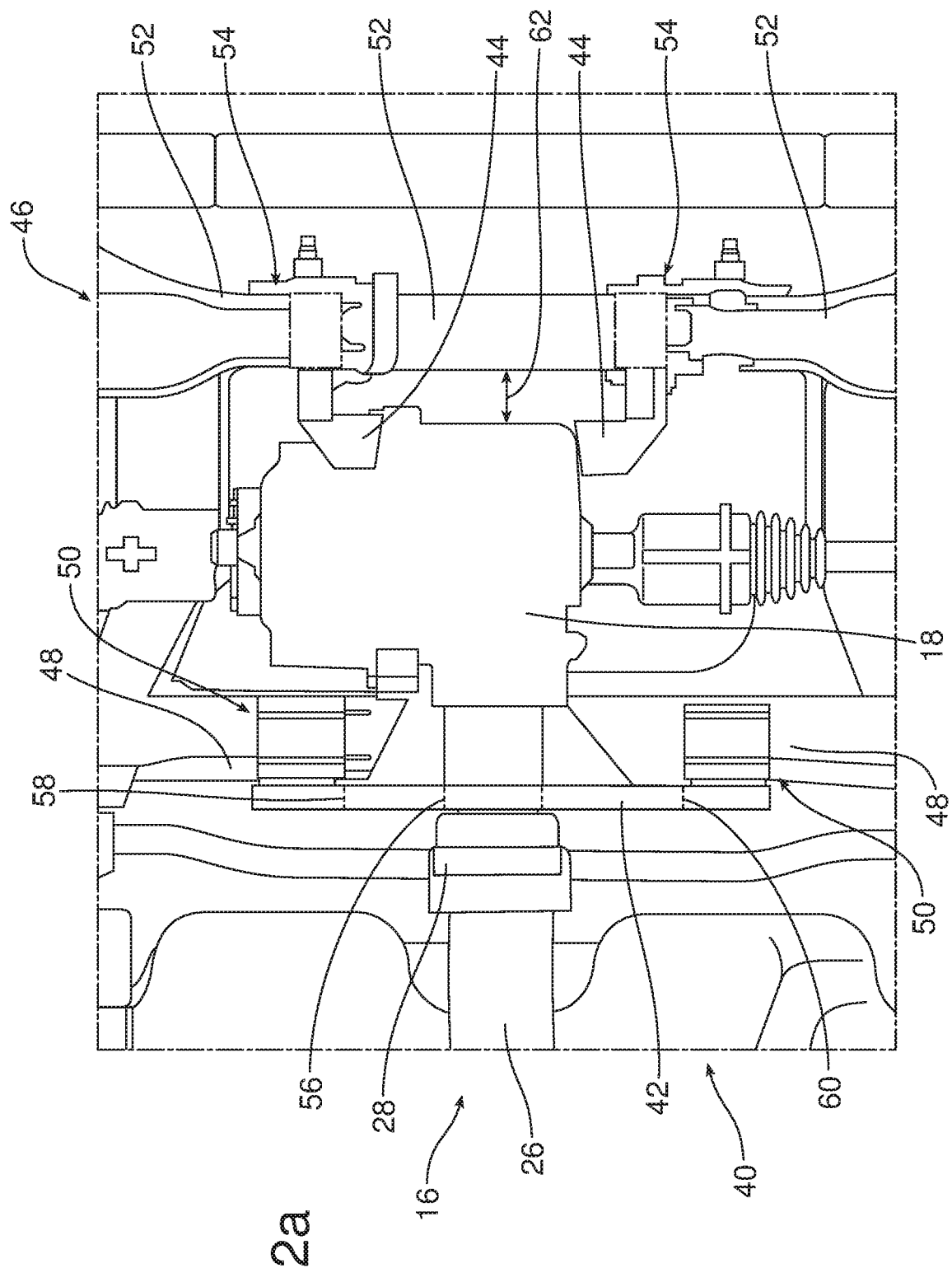
FIG. 2a is a detailed bottom plan view of a first embodiment illustrating how the RDU is attached to the front cross member of the rear subframe by means of a front RDU mounting bracket and the rear cross member of the rear subframe by means of a rear RDU mounting bracket.
Figure 2B:
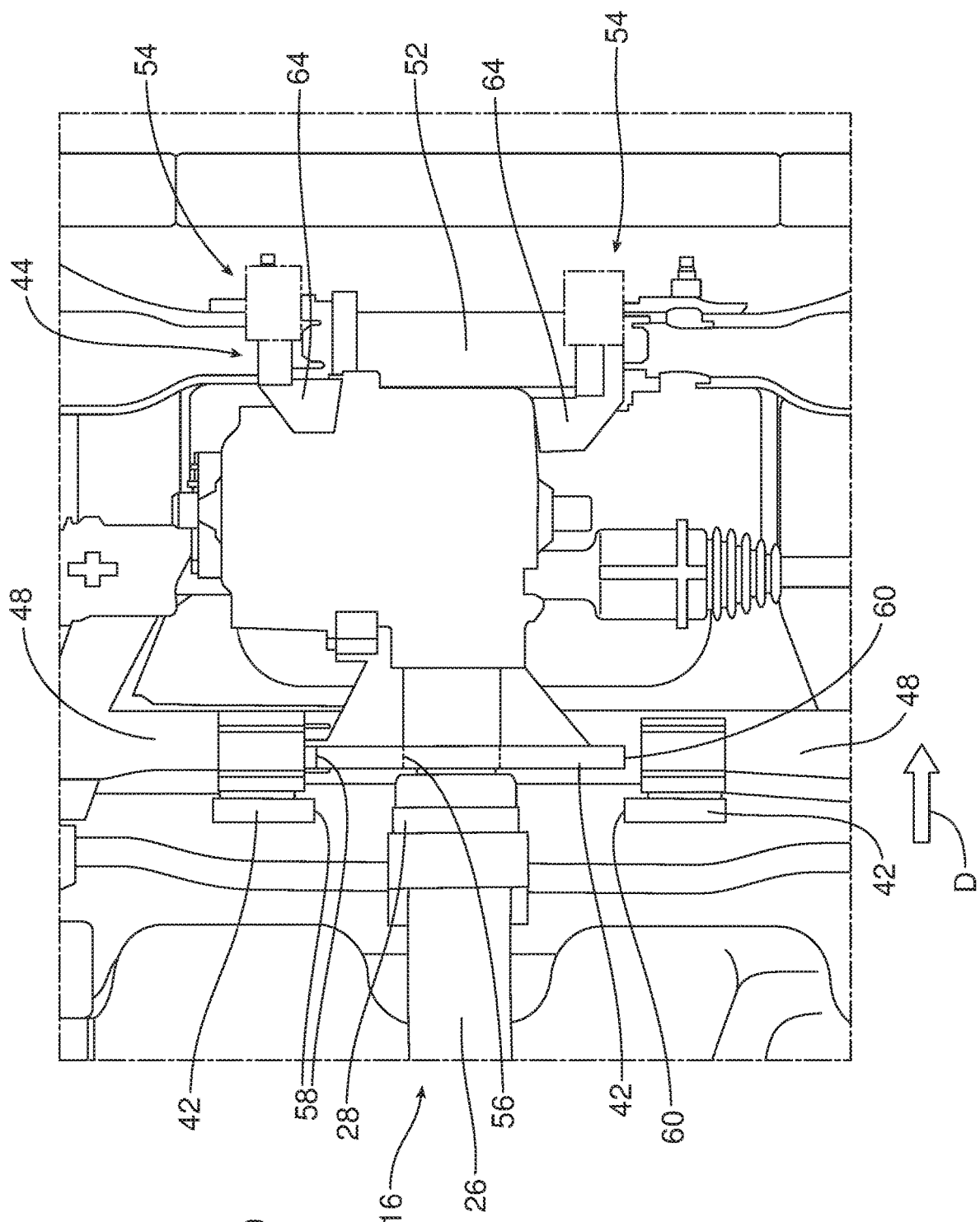
FIG. 2b is an illustration similar to FIG. 2a but illustrating rearward displacement of the RDU into first contact with the rear cross member of the rear subframe wherein that displacement is accommodated by the deforming of the front mounting bracket at two designed fracture lines and the dissipating of energy by the pushing of the bushings out of the rear cross member.

Reference is now made to FIGS. 2a and 2b illustrating a first embodiment of an RDU detachment system. In the illustrated embodiment, that RDU detachment system 40 includes a front RDU mounting bracket 42 and a rear RDU mounting bracket 44 for mounting the RDU 18 to the rear subframe 46 of the motor vehicle. More specifically, the front RDU mounting bracket 42 is connected to a front cross member 48 of the rear subframe 46 by means of two bushing assemblies generally designated by reference numeral 50. The rear RDU mounting bracket 44 is connected to rear cross member 52 of the rear subframe 46 by means of the bushing assemblies 54 (i.e. compliant rubber bushings). In the illustrated embodiment, the front RDU mounting bracket 42 is a single piece while the rear RDU mounting bracket 44 comprises two arms. Here it should be appreciated that either RDU mounting bracket 42, 44 may comprise a single piece or multiple pieces and may be separate components or integrally formed with the housing of the RDU 18. FIG. 2a illustrates this first embodiment of the RDU detachment system 40 in a pre-crash or normal condition.

Reference is now made to FIG. 2b illustrating the RDU detachment system 40 after the RDU has been displaced rearwardly into first or initial contact with the rear cross member 52 of the rear subframe 46 following transmission of an impact force to the RDU through the driveline 16.

As illustrated, the front RDU mounting bracket 42 has an engineered yield to allow the rearward displacement of the RDU 18. More specifically, as illustrated in FIGS. 2a and 2b, the front RDU mounting bracket 42 includes a driveline opening 56 for allowing attachment of the driveline 16 to the RDU 18. The engineered yield is provided by two deformation zones in the form of a first designed fracture line 58 in the front RDU mounting bracket 42 on a first side of the driveline opening 56 and a second designed fracture line 60 in the front RDU mounting bracket on a second side of the driveline opening. Thus, when the RDU 18 is subjected to an impact force transmitted to the RDU through the driveline 16 that exceeds a predetermined, designed threshold, the front RDU mounting bracket 42 is deformed by breaking or fracturing at the two designed fracture lines 58, 60. The resulting deformation or fracturing dissipates a portion of the impact force or crash energy while also freeing the RDU to be displaced motor vehicle rearward toward the rear cross member 52 of the rear subframe 46. (See action arrow D in FIG. 2b).

As best illustrated in FIG. 2a, a defined clearance space 62 is provided between the rearmost portion of the RDU 18 and the forwardmost portion of the rear cross member 52. It is this space that designed clearance space 62 that accommodates the rearward displacement of the RDU 18. Typically, the designed clearance space is between about 40 mm and about 60 mm although a dimension outside of this range is also possible.

As the RDU 18 is displaced rearwardly, the impact force is applied to the bushing assemblies 54. Thus, the compliant rubber bushing assemblies 54 are at least partially pushed out of the rear cross member 52 of the rear subframe 46 by the arms 64 of the rear RDU mounting bracket 44. This action serves to dissipate a portion of the impact force or crash energy. As should be appreciated, a portion of the impact force or crash energy dissipated by the additive effect of the deformation of the front RDU mounting bracket 42 and the pushing or expelling of the compliant rubber bushing assemblies 54 from the rear cross member 52 substantially reduces the impulse energy when the RDU 18 first contacts the rear cross member 52.

Reference is now made to FIG. 5a illustrating the position of the RDU 18 with respect to the rear cross member 52 when in the pre-crash or normal condition. The designed clearance space 62 is clearly apparently in this figure.

As also illustrated, the rear cross member 52 includes a downwardly inclined face 66 which is oriented toward the RDU 18. As should be appreciated, the inclined face 66 has an upper end 68 oriented vehicle forward of the lower end 70.

As illustrated in FIGS. 5a and 5b, the upper end 68 of the inclined face 66 includes an initial contact point 72. That initial contact point 72 is located above a center of applied force line 74 that extends along the driveline 16 and through the RDU 18 toward the rear cross member 52. When the RDU first engages the rear cross member 52 at this initial contact point 72, the initial contact point functions to introduce a moment to rotate the RDU 18 downward (note action arrows E in FIG. 5b). This is done while the RDU is guided downward in the direction of action arrow F by the inclined face 66 so that the RDU moves toward the ground under the rear subframe 46. In certain motor vehicle applications and under certain conditions, it should be appreciated that the driveline 16 is also deformed to help encourage and accommodate the rotational and downward movement of the RDU (note, for example, the point of the bend 30 in the rear prop shaft 26 of the driveline 16 illustrated in FIG. 5b).

Reference is now made to FIGS. 6a and 6b illustrating an alternative embodiment to that illustrated in FIGS. 5a and 5b wherein the rear cross member 52 of the rear subframe 46 includes a downwardly inclined face 66 incorporating a forwardly projecting initial contact point 72. In this embodiment the downwardly inclined face 66 assumes a V shape.

When the RDU 18 is displaced rearward through the designed clearance space 62 and comes into contact with the projecting initial contact point 72, that engagement introduces a moment to rotate the RDU downward. However, since the contact point 72 has been moved forward in this embodiment from the position illustrated in the previous embodiment shown in FIGS. 5a and 5b, the RDU 18 is rotated a greater amount before engagement with the inclined face 66 that serves to guide the RDU downward under the rear cross member 52. See FIGS. 6a and 6b which illustrate the rotational and downward displacement of the RDU by the rear cross member 52 of the rear subframe 46.

Figure 3A:
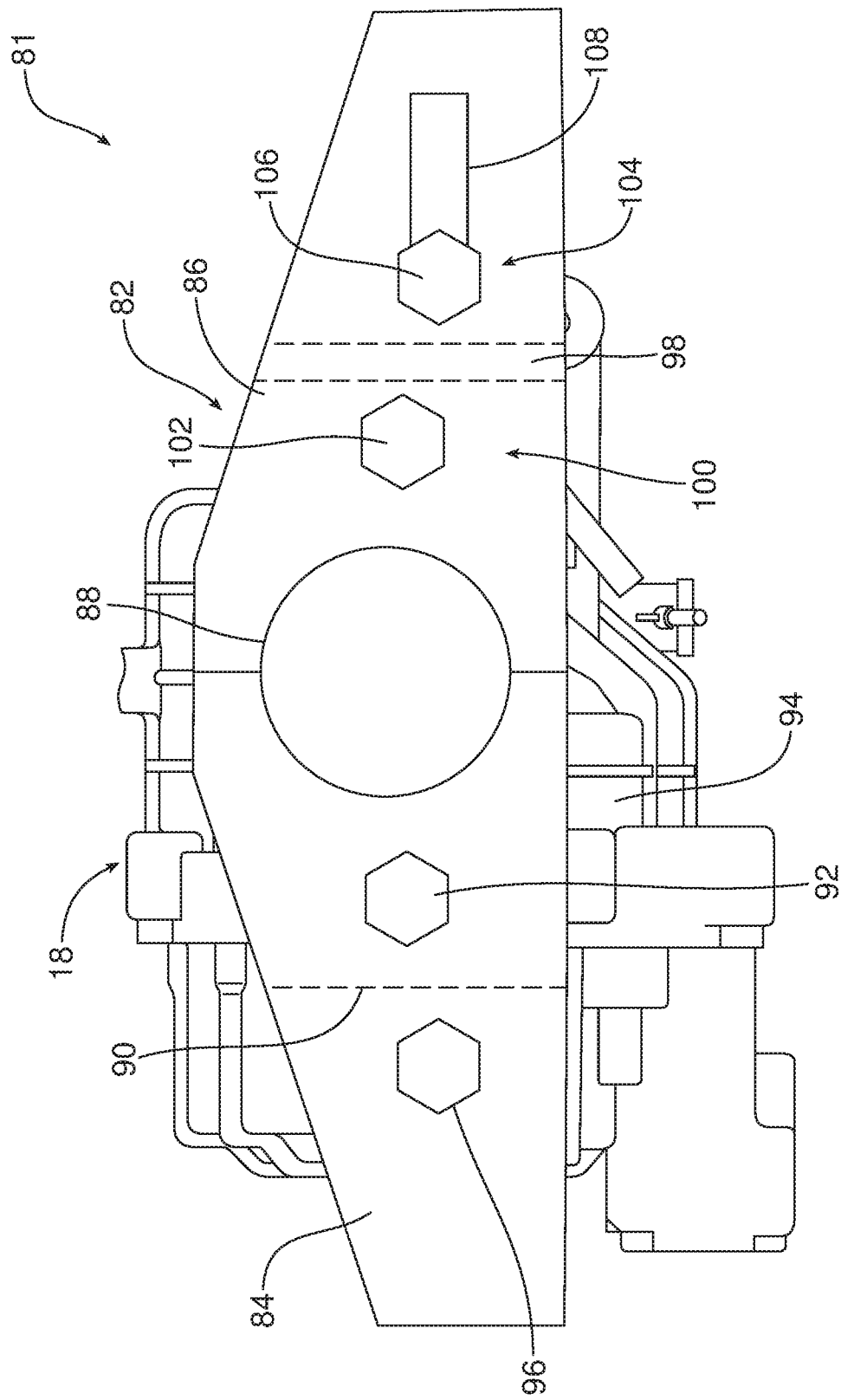
FIG. 3a is a detailed front elevational view of a second possible embodiment wherein the front mounting bracket includes a designed fracture line on one side of a driveline opening and a designed deformation zone on the other side of the driveline opening.
Figure 3B:
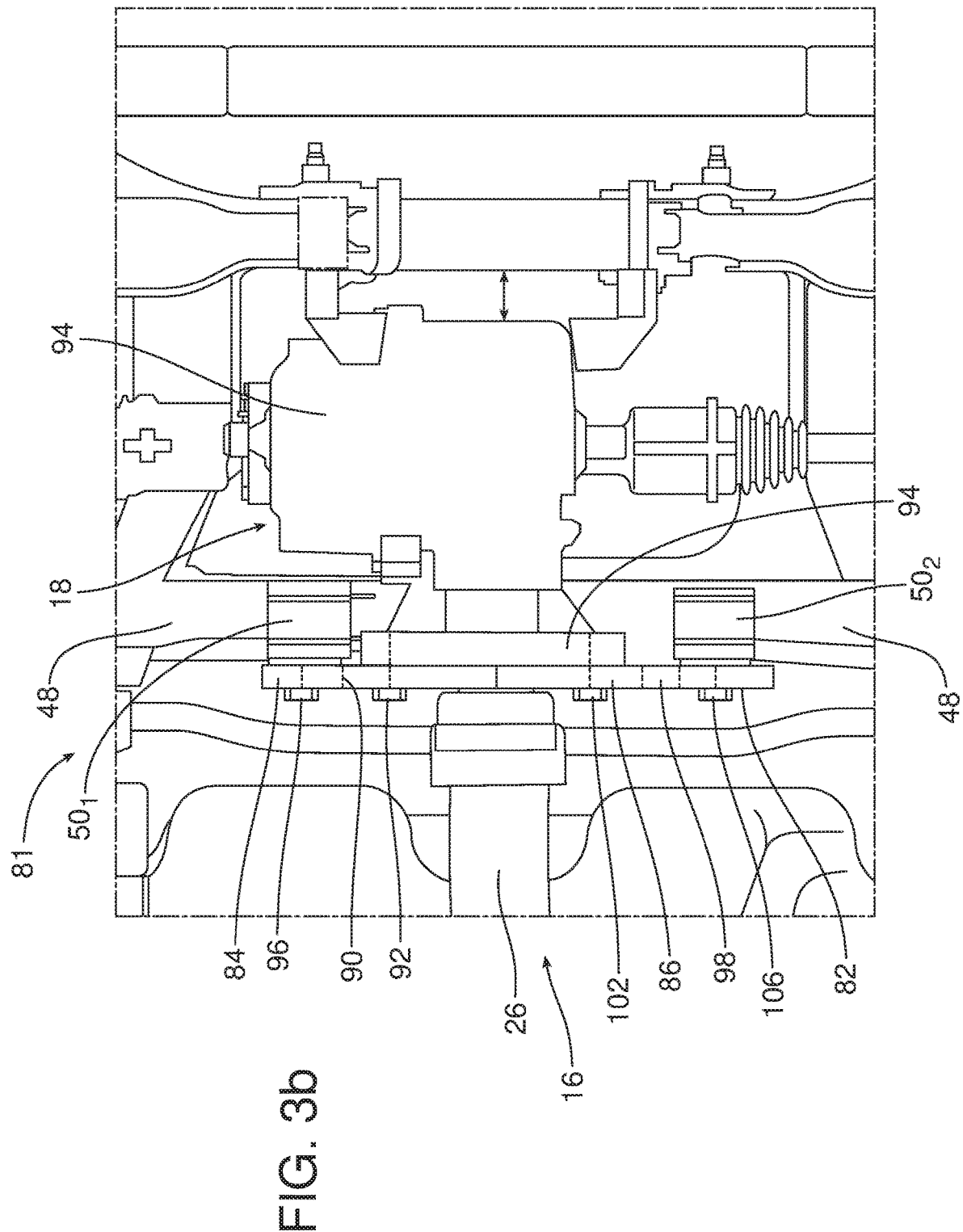
FIG. 3b is a detailed bottom plan view of the second possible embodiment of the front mounting bracket shown in FIG. 3a in a normal operating condition before any rearward displacement of the RDU.
Figure 3C:
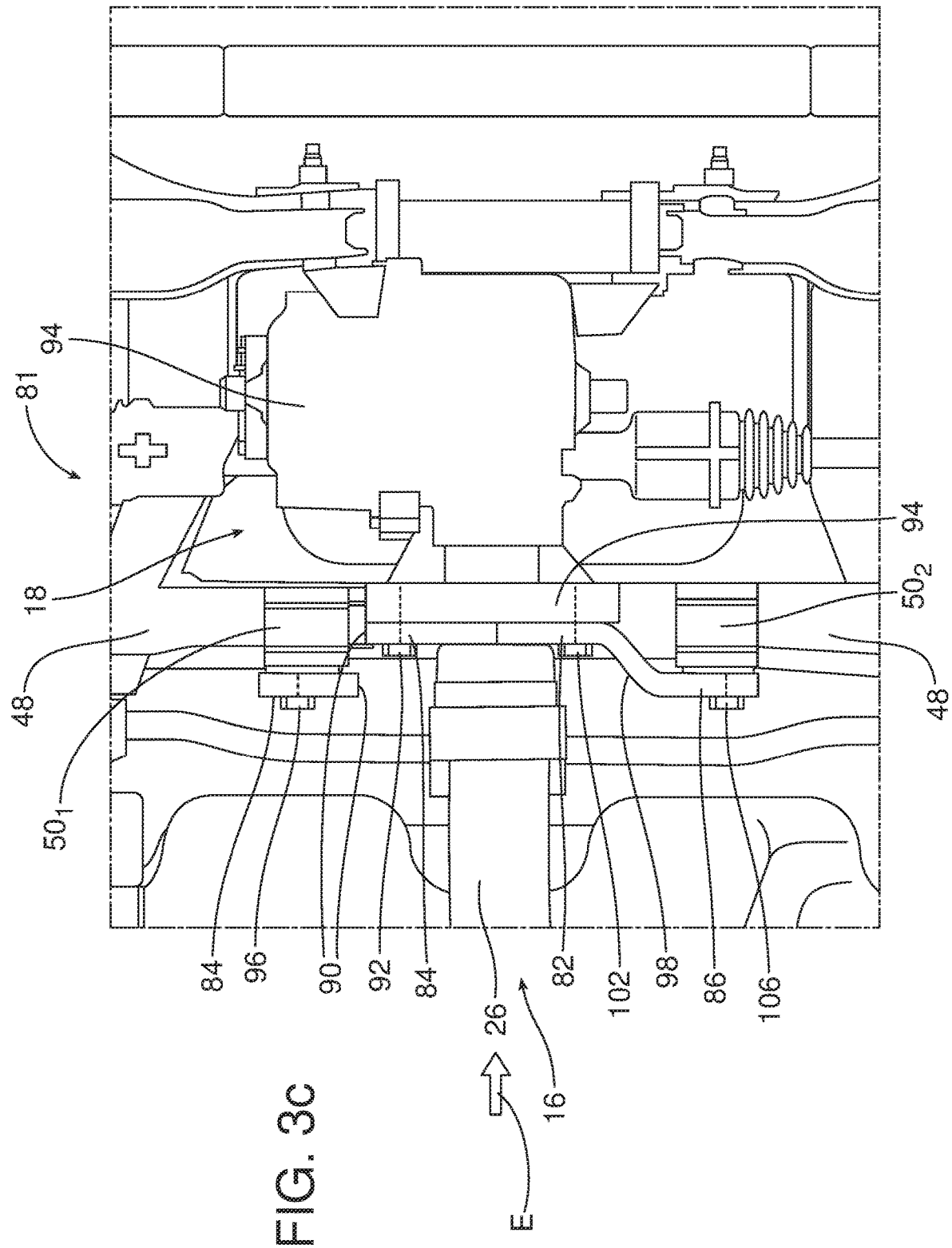
FIG. 3c is a detailed bottom plan view of the second possible embodiment of the front mounting bracket shown in FIG. 3a following rearward displacement of the RDU in response to an impact force transmitted to the RDU through the driveline.

Reference is now made to FIGS. 3a-3c illustrating a second possible embodiment of the RDU detachment system 81. In the embodiment of the RDU detachment system 81 illustrated in FIGS. 3a and 3b, the front RDU mounting bracket 82 is modified from the front RDU mounting bracket 42 illustrated for the RDU detachment system 40 in FIGS. 2a and 2b. More specifically, the front RDU mounting bracket 82 includes a first section 84 and a second section 86. The front RDU mounting bracket 82 still includes a driveline opening 88. However, the engineered yield is achieved in a different manner.

More specifically, the first section 84 of the front RDU mounting bracket 82 includes a designed fracture line 90 on a first side of the driveline opening 88. A bolt 92 secures the first section 84 to the RDU housing 94 while a bolt 96 secures the first section to the front cross member 48 via the bushing assembly 501.

The second section 86 of the front RDU mounting bracket 82 includes a designed deformation zone 98 on a second side of the driveline opening 88. More specifically, a fixed RDU mounting point 100 between the RDU mounting bracket 82 and the RDU housing 94 is provided by the bolt 102. That fixed RDU mounting point 100 is on the second side of the driveline opening 88 between the driveline opening and a slip RDU mounting point 104.

The slip RDU mounting point 104 includes a first bolt 106 received in an elongated slot 108 in the RDU mounting bracket 82. That elongated slot 108 has a longitudinal axis that extends in a substantially horizontal plane substantially perpendicular to the driveline 16. The slip RDU mounting point 104 connects the RDU mounting bracket 82 to the front cross member 48 through the bushing 502. The elongated slot 108 of the slip RDU mounting point 104 allows the second section 86 of the front RDU mounting bracket 82 to slip with respect to the RDU housing 93 when the RDU is subjected to an impact force greater than the designed threshold transmitted through the driveline 16.

When the impact force is applied in the direction of action arrow E as illustrated in FIG. 3c, the first section 84 breaks along the designed fracture line 90 on one side of the driveline 16 while the second section 86 elongates and bends at the designed deformation zone 98 on the other side of the driveline. As should be appreciated, the deformation of the front RDU mounting bracket 44 in the embodiment illustrated in FIGS. 2a and 2b is strictly by means of designed fracture lines 58, 60 but the deformation of the front RDU mounting bracket 82 in the FIGS. 3a and 3b embodiment is by means of one designed fracture line 90 and one designed deformation zone 98.

Figure 4A:
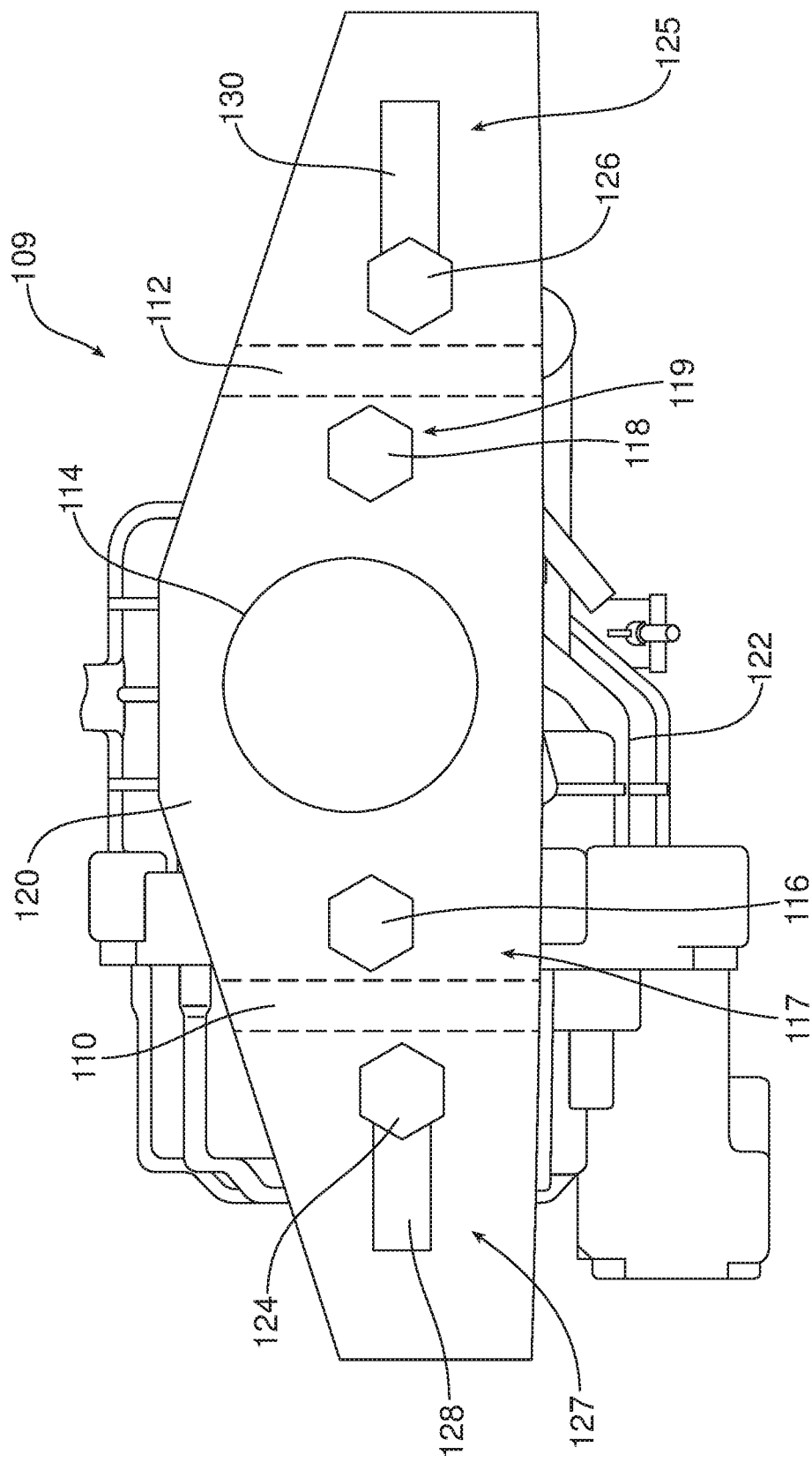
FIG. 4a is yet another alternative embodiment of front RDU mounting bracket incorporating a first designed deformation zone on a first side of the driveline opening and a second designed deformation zone on a second side of the driveline opening.
Figure 4B:
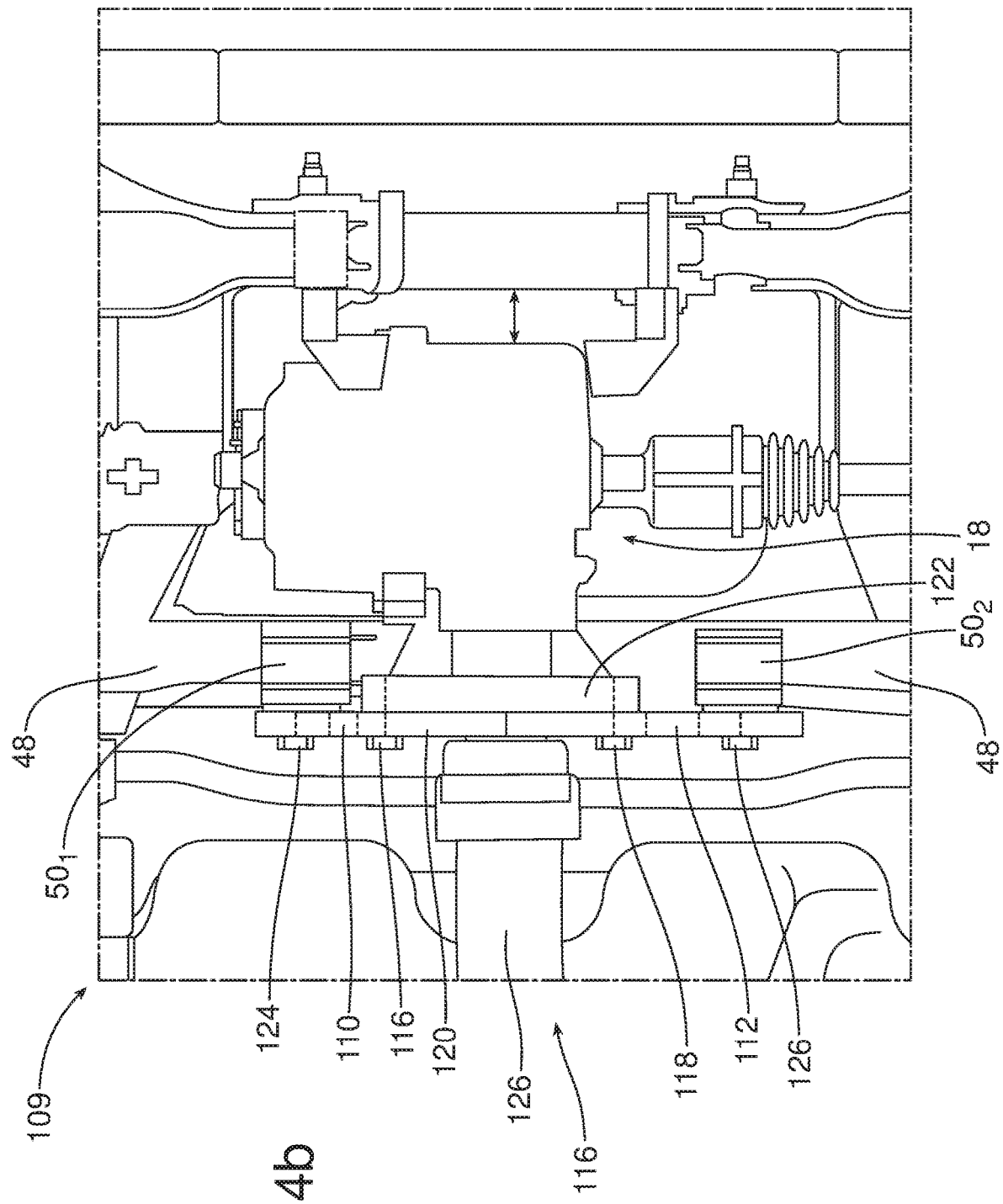
FIG. 4b is an illustration of the alternative embodiment illustrated in FIG. 4a in a normal operating condition before any rearward displacement of the RDU.
Figure 4C:
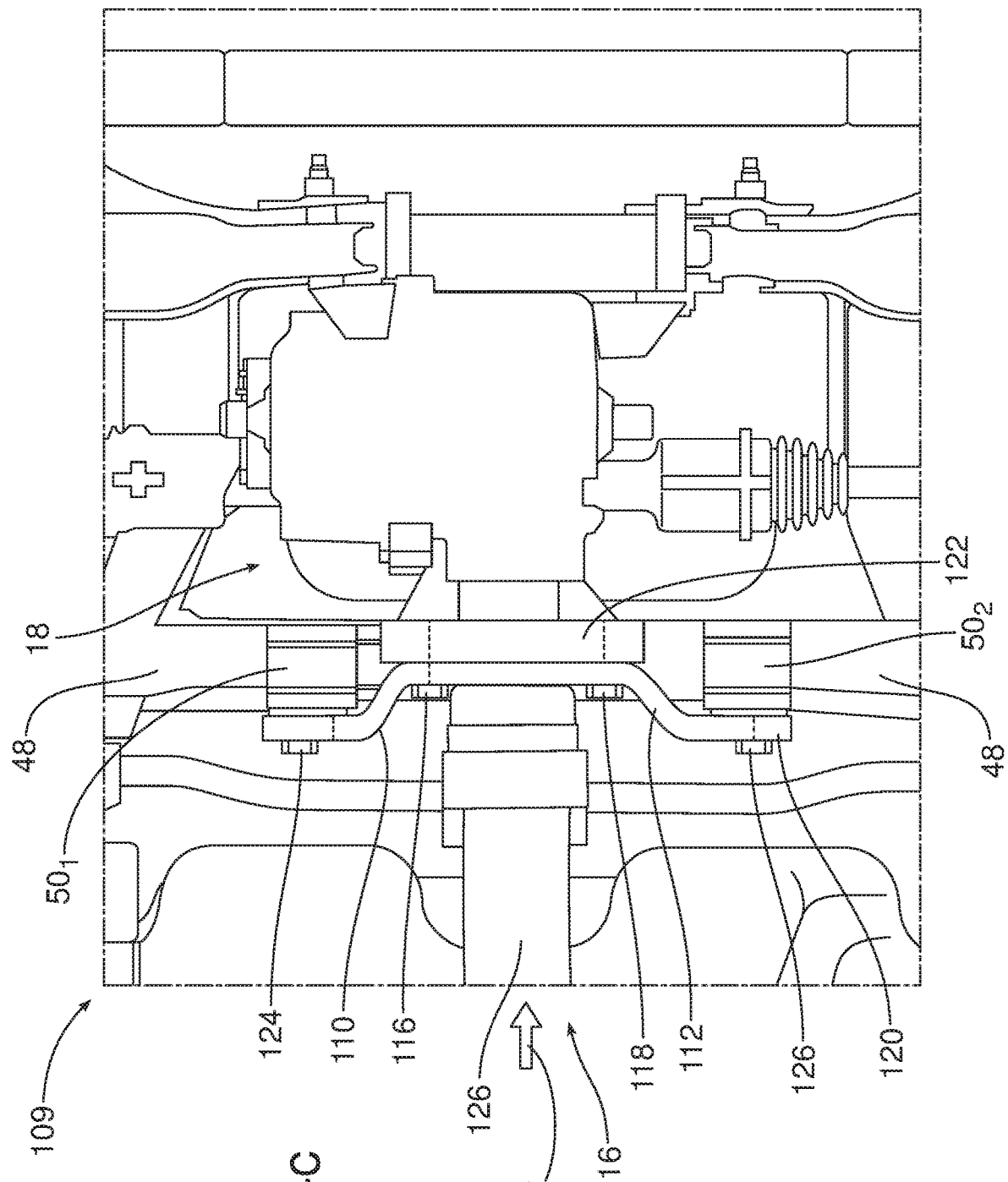
FIG. 4c is an illustration of the alternative embodiment illustrated in FIG. 4a following rearward displacement of the RDU in response to an impact force transmitted to the RDU through the driveline.

FIGS. 4a-4c illustrate yet another embodiment of the RDU detachment system 109 wherein deformation is provided by designed deformation zones 110, 112 on each side of the driveline opening 114. Toward this end, note the bolts 116, 118 that are provided at the respective first and second fixed RDU mounting points 117, 119 securing the RDU mounting bracket 120 to the RDU housing 122 and the bolts 124, 126 and the cooperating elongated slots 128, 130 in the RDU mounting bracket 120 that are provided at the respective first and second slip RDU mounting points 125, 127 to provide slip joints between the bushings 501, 502 in the forward cross member 48 and the RDU mounting bracket 120.

When the impact force is applied in the direction of action arrow F as illustrated in FIG. 4c, the RDU mounting bracket 120 bends and elongates at the designed deformation zones 110, 112 on both sides of the driveline 16. Thus, in this embodiment the RDU is still secured to the forward cross member 48 by the bracket 120 even after the impact and the providing of the desired engineered yield.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A rear drive unit ("RDU") detachment system for a motor vehicle, comprising:
    a front RDU mounting bracket having an engineered yield to allow rearward displacement of an RDU in response to an impact force transmitted to said RDU through a driveline;
    a rear RDU mounting bracket;
    a rear cross member including a downwardly inclined face oriented toward said RDU, wherein said downwardly inclined face has an upper end oriented vehicle forward of a lower end; and
    two bushings connecting said rear RDU mounting bracket with said rear cross member at two points; and
    wherein said front mounting bracket includes a first slip RDU mounting point on a first side of said driveline opening and a first fixed RDU mounting point on said first side of said driveline opening between said first slip RDU mounting point and said driveline opening and wherein said first slip RDU mounting point includes a first bolt received in a first elongated slot in said front RDU mounting bracket wherein said first elongated slot has a first longitudinal axis extending in a horizontal plane substantially perpendicular to said driveline.

2. The RDU detachment system of claim 1, wherein said upper end includes an initial contact point projecting toward said RDU.

3. The RDU detachment system of claim 2, wherein said initial contact point is located above a center of applied force line extending along said driveline and through said RDU toward said rear cross member whereby said initial contact point introduces a moment to rotate said RDU downward when said RDU is displaced into said rear cross member.

4. The RDU detachment system of claim 3, wherein said front mounting bracket includes a driveline opening and said engineered yield includes a first designed fracture line in said front mounting bracket on a first side of said driveline opening and a second designed fracture line in said front mounting bracket on a second side of said driveline opening.

5. The RDU detachment system of claim 3, wherein said front mounting bracket includes a driveline opening and said engineered yield includes a first designed deformation zone in said front mounting bracket on a first side of said driveline opening and a second designed deformation zone in said front mounting bracket on a second side of said driveline opening.

6. The RDU detachment system of claim 5, wherein said front mounting bracket includes a second RDU slip mounting point on said second side of said driveline opening and a second fixed RDU mounting point on said second side of said driveline opening between said second slip RDU mounting point and said driveline opening.

7. The RDU detachment system of claim 6, wherein said second slip RDU mounting point includes a second bolt received in a second elongated slot in said front RDU mounting bracket wherein said second elongated slot has a second longitudinal axis extending in said horizontal plane substantially perpendicular to said driveline.

8. The RDU detachment system of claim 1, further including a clearance space provided between a rearmost portion of the RDU and a forwardmost portion of the rear cross member to accommodate rearward displacement of the RDU into the two bushings.

* * * * *